US012564942B2

(12) United States Patent
    Ijiri et al.

(10) Patent No.: US 12,564,942 B2
(45) Date of Patent: Mar. 3, 2026

(54) CONTROL DEVICE, ROBOT SYSTEM, AND ROBOT CONTROL METHOD

(71) Applicant: OMRON Corporation, Kyoto (JP)

(72) Inventors: Yoshihisa Ijiri, Kyoto (JP); Kazutoshi Tanaka, Tokyo (JP); Masashi Hamaya, Tokyo (JP); Felix Von Drigalski, Tokyo (JP); Yoshiya Shibata, Kyoto (JP); Chisato Nakashima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 392 days.

(21) Appl. No.: 17/922,144

(22) PCT Filed: May 10, 2021

(86) PCT No.: PCT/JP2021/017662
    § 371 (c)(1),
    (2) Date: Oct. 28, 2022

(87) PCT Pub. No.: WO2021/241182
    PCT Pub. Date: Dec. 2, 2021

(65) Prior Publication Data
    US 2023/0173667 A1     Jun. 8, 2023

(30) Foreign Application Priority Data
    May 29, 2020    (JP) ................................. 2020-094782

(51) Int. Cl.
    *B25J 9/00*        (2006.01)
    *B25J 9/16*        (2006.01)
    *B25J 17/02*       (2006.01)

(52) U.S. Cl.
    CPC ........... *B25J 9/1612* (2013.01); *B25J 9/1674* (2013.01); *B25J 9/1694* (2013.01); *B25J 17/0225* (2013.01)

(58) Field of Classification Search
    CPC ...... B25J 9/1612; B25J 9/1674; B25J 9/1694; B25J 17/0225; B25J 9/1635; B25J 9/1641;
    (Continued)

(56) References Cited

U.S. PATENT DOCUMENTS 5,673,367 A * 9/1997 Buckley ................. B25J 9/1612
                                                    706/23
9,205,558 B1 * 12/2015 Zevenbergen ......... B25J 9/1664
                            (Continued)

FOREIGN PATENT DOCUMENTS

CN        102483625 A     5/2012
CN        111093909 A     5/2020
                    (Continued)

OTHER PUBLICATIONS

Extended European Search Report issued in European Appln No. 21813497.1, mailed Apr. 4, 2024.
(Continued)

*Primary Examiner* — Ian Jen
(74) *Attorney, Agent, or Firm* — Rossi, Kimms & McDowell LLP

(57)        ABSTRACT

A control apparatus of a robot that includes a flexible portion and a locking mechanism for fixing the flexible portion, the control apparatus including: a lock control unit configured to control locking and unlocking of the flexible portion; and an operation control unit configured to control operation of the robot using different types of control policies depending on whether the flexible portion is locked or unlocked. With this control apparatus, it is possible to effectively control a robot in which locking and unlocking of the flexible portion can be switched.

7 Claims, 4 Drawing Sheets

(58) Field of Classification Search
CPC ......... B25J 9/1687; G05B 2219/39111; G05B 2219/39186; G05B 2219/39575
See application file for complete search history.

(56) References Cited

U.S. PATENT DOCUMENTS

| | | | | |
|---|---|---|---|---|
| 10,118,300 | B2 * | 11/2018 | Wagner | B25J 15/0625 |
| 10,647,002 | B2 * | 5/2020 | Wagner | B25J 13/086 |
| 2012/0143371 | A1 | 6/2012 | Selnes et al. | |
| 2015/0217445 | A1 | 8/2015 | Hietmann et al. | |
| 2016/0101519 | A1 * | 4/2016 | Kopicki | B25J 9/1697 |
| | | | | 700/254 |
| 2016/0167228 | A1 * | 6/2016 | Wellman | B25J 9/1602 |
| | | | | 901/3 |
| 2017/0106534 | A1 | 4/2017 | Nakamoto et al. | |
| 2018/0043539 | A1 | 2/2018 | Kamon et al. | |
| 2019/0137954 | A1 * | 5/2019 | De Magistris | B25J 9/1687 |
| 2020/0017317 | A1 * | 1/2020 | Yap | G06Q 10/08 |
| 2020/0023520 | A1 * | 1/2020 | Yoshizumi | B25J 9/1687 |
| 2020/0070358 | A1 * | 3/2020 | Mousavi | B25J 19/028 |
| 2020/0164506 | A1 * | 5/2020 | Hallock | B25J 9/1612 |
| 2020/0368919 | A1 | 11/2020 | Stoelen | |

FOREIGN PATENT DOCUMENTS

| | | | |
|---|---|---|---|
| EP | 2500150 | A2 | 9/2012 |
| JP | H05192892 | A | 8/1993 |
| JP | H0683427 | A | 3/1994 |
| JP | H08118281 | A | 5/1996 |
| JP | H11231925 | A | 8/1999 |
| JP | 2003103489 | A | 4/2003 |
| JP | 2005177918 | A | 7/2005 |
| JP | 2008062335 | A | 3/2008 |
| JP | 2016168663 | A | 9/2016 |
| JP | 2017052052 | A | 3/2017 |
| WO | 2010024795 | A1 | 3/2010 |

OTHER PUBLICATIONS

International Search Report issued in Intl. Appln. No. PCT/JP2021/017662 mailed Jun. 29, 2021. English translation provided.
Written Opinion issued in Intl. Appln. No. PCT/JP2021/017662 mailed Jun. 29, 2021. English translation provided.
Office Action issued in Taiwanese Appln. No. 110116814 on Dec. 14, 2021. English translation provided.
Office Action issued in Chinese Appln. No. 202180031387.5, mailed Dec. 25, 2024. English translation provided.

* cited by examiner

| WORK INSTRUCTION | LOCK | CONTROL POLICY TYPE |
|---|---|---|
| Move | ON | SPACE STATE MODEL-BASED |
| Explore | OFF | MACHINE LEARNING-BASED |
| Align (single hole) | OFF | MACHINE LEARNING-BASED |
| Insert | OFF | MACHINE LEARNING-BASED |
| Fix | ON | SPACE STATE MODEL-BASED |
| . . . | . . . | . . . |

CONTROL DEVICE, ROBOT SYSTEM, AND ROBOT CONTROL METHOD

TECHNICAL FIELD

The present invention relates to control of a robot provided with a flexible portion.

RELATED ART

Great care needs to be taken when performing an operation that involves contact with an object using a robot solely constituted by highly rigid mechanisms, and modelling in which the object and work environment are determined needs to be performed in addition to performing control with a reduced operation speed. Also, although highly precise state measurements are required when precise work is to be performed using only highly rigid mechanisms, in actuality, errors occur in the measurements. Thus, using a robot solely constituted by highly rigid mechanisms leads to the issue of a reduced operation speed or a failure to achieve high operation success rates required on site.

On the other hand, a robot including a flexible mechanism for which deformation is allowed can perform operations involving contact with a target at high operation speeds and realize high operation success rates. However, there are also types of work that are made unstable due to vibration and the like that occurs when the flexible mechanism moves, which would have otherwise been stable had a highly rigid mechanism been used.

In order to exhibit the merits of both a highly rigid mechanism and a flexible mechanism, Patent Documents 1 to 3 propose a robot provided with a locking mechanism-equipped flexible element. In these robots, a fixable locking mechanism is used when a flexible portion (compliance unit) is at a starting position or another position.

However, in Patent Documents 1 to 3, no consideration is given to what control is performed when the flexible portion is and is not locked.

RELATED ART DOCUMENT

Patent Document

Patent Document 1: Japanese Unexamined Patent Publication H05-192892
Patent Document 2: Japanese Unexamined Patent Publication 2005-177918
Patent Document 3: Japanese Unexamined Patent Publication H08-118281

SUMMARY OF THE INVENTION

Problem to be Solved by the Invention

The present invention was realized in light of the above-mentioned circumstances, and it is thus an object of the present invention to provide a technology with which it is possible to effectively control a robot in which switching between locking and unlocking of a flexible portion is possible.

Means for Solving the Problems

In order for the present invention to achieve the above-described object, the following configurations are employed.

The first aspect of the present invention is a control apparatus of a robot that includes a flexible portion and a locking mechanism for fixing the flexible portion, the control apparatus including:

a lock control unit configured to control locking and unlocking of the flexible portion; and an operation control unit configured to control operation of the robot using different types of control policies depending on whether the flexible portion is locked or unlocked.

The flexible portion is a physically flexible element, that is, it conceptually includes a passive element in which a restoring force acts against displacement. The physically flexible element typically includes an elastic body such as a spring or a piece of rubber, a damper, or a pneumatic or hydraulic cylinder. The flexible portion may be a mechanism in which flexibility is obtained by using force control or only through force control.

The control policy is an element (map) for determining the action u to be taken next when the robot is in a certain state x. The control policy is typically indicated by a probability density function $\pi(u|x)$ or a function $u=\pi(x)$.

The types of control policies include, for example, a machine learning-based control policy, a control policy using a state space model that is based on modern control theory, and a control policy of classical control. The machine learning-based control policy is a data driven control policy derived using a machine learning algorithm, and includes, for example, a control policy derived through reinforcement learning, a control policy derived through deep learning, and a control policy derived through model-base reinforcement learning. The control policy based on a state space model is a control policy that is derived based on a system model (state space model), which is known information regarding a control object, and includes a control policy that is based on optimal control or model based predictive control. The control policy of classical control is a control policy that is based on classical control such as PID control. The control policies that are based on the state space model and the classical control policy can be perceived as analytical control policies.

In this aspect, a configuration may be employed where, if the flexible portion is unlocked (not fixed), the operation control unit controls operation of the robot using a machine learning-based control policy. When the flexible portion is not fixed, the position of the leading end of the robot is uncertain, and thus it is difficult to perform modelling using a state space model or the like and perform control, thus making a machine learning-based control policy preferable.

In this aspect, a configuration may be employed where, if the flexible portion is locked (fixed), the operation control unit controls the robot using a control policy of classical control or control based on a state space model. When the flexible portion is fixed, the position of the leading end of the robot can be accurately obtained, and thus precise control can be performed using an analytical control policy.

The control apparatus according to this aspect may lock and unlock the flexible portion depending on the input work instruction, and the operation control unit may switch the control policy to be used to control operation of the robot. Locking and unlocking and switching of a control policy are performed based on one input, namely a work instruction, and thus processing is simplified. Also, one of a plurality of machine learning-based control policies having different model parameters can be used according to the work instruction.

Also, depending on the distance between the robot and an object or whether or not the robot and object are in contact with each other, the control apparatus according to this aspect may lock and unlock the flexible portion and the operation control unit may switch the control policy used to control operation of the robot. When the robot and object are close to or in contact with each other, it is desirable that the flexible portion is unlocked in view of safety, and switching to a control policy according to the unlocking can be performed.

Also, depending on whether the flexible portion is locked or unlocked, the control apparatus according to this aspect may determine, not only the control policy to be used, but also sensor information to be used. Determining the sensor information to be used includes determining or changing the type of sensor information to be obtained from the robot and determining or changing the type of sensor information to be input to a control policy without changing the sensor information to be obtained from the robot. For example, if the flexible portion is unlocked, it is conceivable to make a determination to use sensor information indicating the state of the flexible portion.

The robot may include a gripper configured to grip an object, and an arm configured to move the gripper, and the flexible portion of the present aspect may be provided at at least one of an intermediate position of the gripper, a position between the gripper and an arm, and an intermediate position of the arm.

A second aspect of the present invention is a robot system including:

a robot that is provided with a gripper configured to grip an object and an arm configured to move the gripper, and includes a flexible portion provided at at least one of an intermediate position of the gripper, a position between the gripper and the arm, and an intermediate position of the arm; and the control apparatus according to the first aspect.

A third aspect of the present invention is a control method of controlling a robot that includes a flexible portion and a locking mechanism for fixing the flexible portion and is to be performed by a control apparatus, the control method comprising:

a lock controlling step of controlling locking and unlocking of the flexible portion;

a policy selecting step of selecting a control policy to be used for control of operation of the robot depending in whether the flexible portion is locked or unlocked; and an operation controlling step of controlling operation of the robot using the selected policy.

The present invention can also be comprehended as a program for realizing the aforementioned control method and a recording medium in which the program is non-temporarily recorded. Note that the present invention can also be configured by combining, as much as possible, the above units and processes.

Effects of the Invention

According to the present invention, it is possible to effectively control a robot in which it is possible to switch between locking and unlocking of a flexible portion.

EMBODIMENTS OF THE INVENTION

\<Application Example\>

Figure 1:
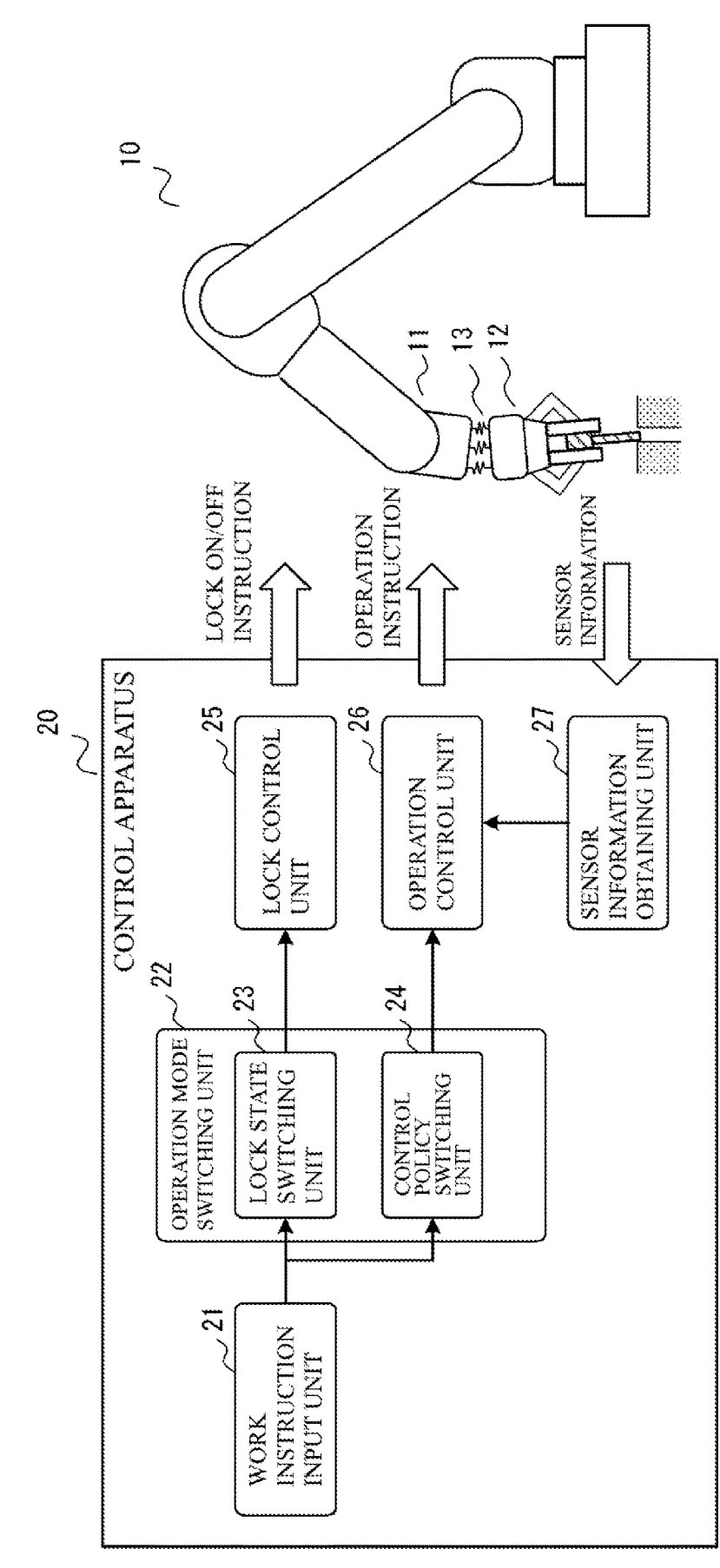
FIG. 1 is a diagram illustrating the outline of a robot system to which the present invention has been applied.

An application example of a robot system 1 according to the present invention will be described with reference to FIG. 1. The robot system 1 includes a robot 10 provided with a flexible portion 13 and a control apparatus 20 that controls the robot 10. The flexible portion 13 of the robot 10 can be locked or unlocked, and the control apparatus 20 controls operation of the robot 10 using different types of control policies depending on whether or not the flexible portion 13 of the robot 10 is locked or unlocked.

Specifically, when the flexible portion 13 is unlocked, the control apparatus 20 controls the operation of the robot 10 using a machine learning-based control policy. When the flexible portion 13 is unlocked, the position of the leading end of a gripper 12 of the robot 10 is not certain, and thus work can be properly executed by using the machine learning-based control policy. On the other hand, when the flexible portion 13 is locked, the control apparatus 20 controls the robot 10 using control policy of classical control or control based on a state space model. When the flexible portion 13 is locked, the position of the leading end of the gripper 12 of the robot 10 can be accurately obtained, and thus precise control can be performed using an analytical control policy.

In this manner, as a result of the control apparatus 20 using the appropriate control policy depending on the state of the flexible portion 13, effective control for when the flexible portion 13 is locked and unlocked can be realized.

First Embodiment

A robot system 1 according to the first embodiment of the present invention shown in FIG. 1 includes a robot 10 and a control apparatus 20.

(Robot)

Figure 2B:
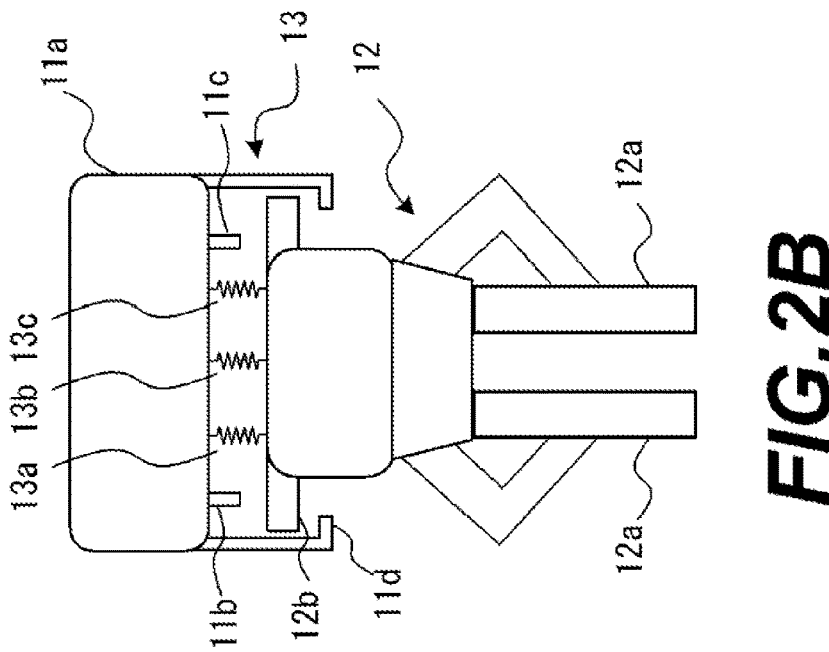
FIGS. 2A and 2B are show an outline of a configuration of a robot.
Figure 2A:
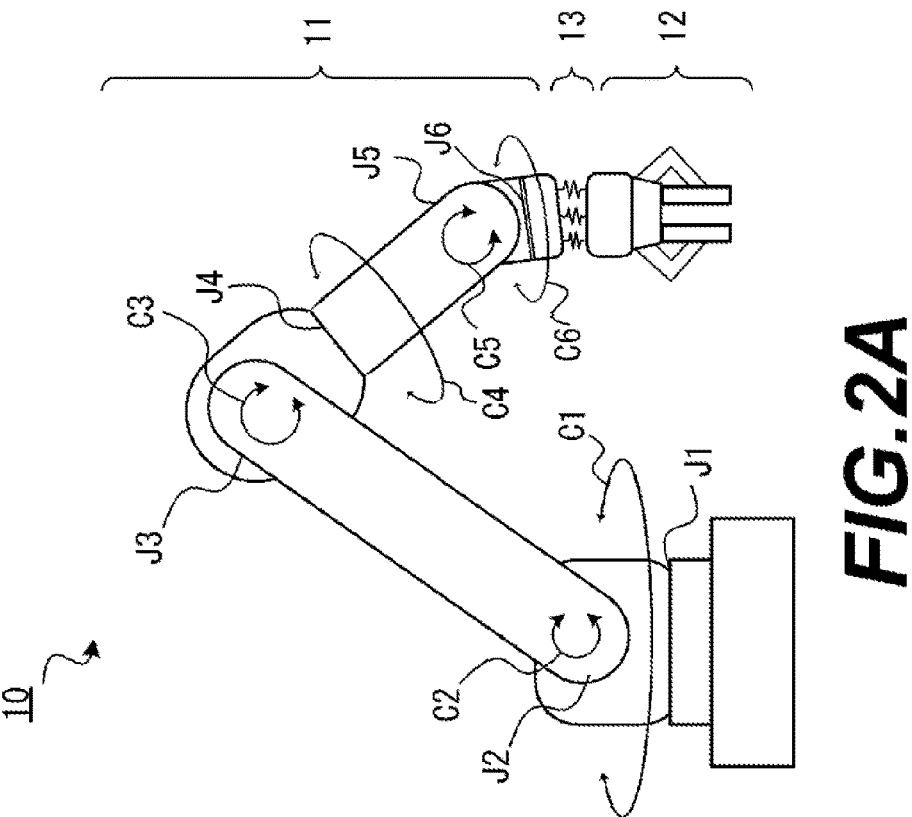

FIGS. 2A and 2B show an outline of the configuration of the robot 10. The robot 10 according to this embodiment is a six-axis, vertically articulated robot, and is provided with the gripper (hand) 12 at the leading end of an arm 11 interposed by the flexible portion 13. The robot 10 performs fitting work which involves fitting a part (a peg, etc.) gripped by the gripper 12 into a hole, for example.

As shown in FIG. 2A, the robot 10 includes the arm 11 provided with joints J1 to J6, the arm 11 having six degrees of freedom. The joints J1 to J6 are connected so that joined links can be rotated, by motors (not shown), in the directions of arrows C1 to C6. Here, a vertically articulated robot is used as an example, but a horizontally articulated robot (SCARA robot) may also be used. Also, a six-axis robot is used as an example, but another articulated robot with other degrees of freedom such as a five-axis or seven-axis robot may be used instead, and a parallel link robot may also be used.

The gripper 12 includes one set of clamping portions 12a and controls the clamping portions 12a to clamp a part. The gripper 12 is connected to a leading end 11a of the arm 11 via the flexible portion 13, and moves as the arm 11 moves. In the present embodiment, the flexible portion 13 is constituted by three springs 13a to 13c arranged in a positional relationship where the base portion of each spring is located at a vertex of an equilateral triangle, but there is no limit on the number of springs. Also, the flexible portion 13 may be another mechanism as long as it is one that generates a restoring force that acts against fluctuations in position to obtain flexibility. For example, the flexible portion 13 may be an elastic body such as a spring or a piece of rubber, a damper, a pneumatic or hydraulic cylinder, or the like. The flexible portion 13 may be a mechanism that obtains flexibility using force control or only through force control. The arm leading end 11a and the gripper 12 are configured to be relatively moveable in the horizontal and vertical directions by 5 mm or more, preferably 1 cm or more, and more preferably 2 cm or more, due to the flexible portion 13.

The robot 10 includes a locking mechanism for switching between a flexible (relatively movable) state where the gripper 12 can move relative to the arm 11 and a fixed state. The state where the positional relationship between the gripper 12 and the arm 11 is fixed is also referred to as the fixed or locked state of the flexible portion 13. Also, the state where the gripper 12 and the arm 11 are flexible is also referred to as an un-fixed or an un-locked state of the flexible portion.

In the present embodiment, the arm 11 includes moving members 11b and 11c that can move from the leading end of the arm 11 in a direction toward the flexible portion 13, and the flexible portion 13 is pressed by the moving members 11b and 11c. When the flexible portion 13 is pressed, locking between a locking portion 12b of the gripper 12 and a locking portion 11d of the arm 11 fixes the positional relationship between the gripper 12 and the arm 11.

Note that the locking mechanism is but one specific example, and any locking mechanism may be employed provided that the gripper 12 can be fixed relative to the arm 11. For example, the positional relationship between the gripper 12 and the arm 11 may be fixed by applying negative pressure between the gripper 12 and the arm 11 and drawing the gripper 12 toward the arm 11. Alternatively, the positional relationship between the gripper 12 and the arm 11 may be fixed by increasing the elastic coefficient of the flexible portion 13.

Here, a configuration where the flexible portion 13 is provided between the leading end 11a of the arm 11 and the gripper 12 is described as an example, but the flexible portion 13 may also be provided at an intermediate position of the gripper 12 (for example, a finger joint or an intermediate position of a columnar portion of a finger), or an intermediate position of the arm (any one of the joints J1 to J6 or an intermediate position of a columnar portion of the arm). Also, the flexible portion 13 may be provided at a plurality of the aforementioned positions.

Locking and unlocking of the flexible portion of the robot 10 and joint operations are carried out according to instructions from the control apparatus 20. Also, the robot 10 includes various sensors that obtain states of the robot 10, and transmits the obtained sensor information to the control apparatus 20.

(Control Apparatus)

Next, the control apparatus 20 will be described.

Figure 3:
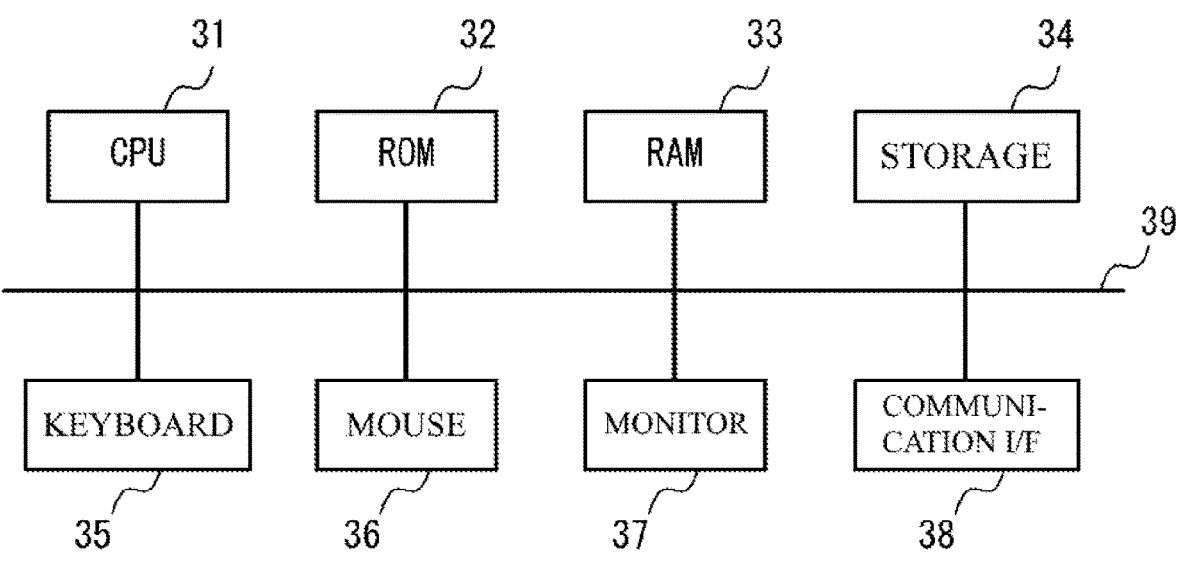
FIG. 3 is a block diagram showing a hardware configuration of a control apparatus of the robot system.

FIG. 3 is a block diagram showing a hardware configuration of a control apparatus according to this embodiment.

As shown in FIG. 3, the control apparatus 20 has a similar configuration to that of an ordinary computer (information processing apparatus), and includes a CPU (Central Processing Unit) 31, a ROM (Read Only Memory) 32, a RAM (Random Access Memory) 33, a storage 34, a keyboard 35, a mouse 36, a monitor 37, and a communication interface 38. These units are communicably connected to each other via a bus bar 39.

In the present embodiment, programs and data for controlling the robot 10 are stored in the ROM 32 or the storage 34. The CPU 31 is a central computational processing unit that executes various programs and controls various units. Specifically, the CPU 31 reads out a program from the ROM 32 or the storage 34 and executes the program using a RAM 33 as a work area. The CPU 31 controls the above units and performs various types of computational processes in accordance with the programs stored in the ROM 32 or the storage 34. Various programs and data are stored in the ROM 32. A program or data is temporarily stored on the RAM 33 serving as a work area. The storage 34 is formed by a HDD (Hard Disk Drive), an SSD (Solid State Drive), or a flash memory, and stores various programs including an operating system, and various kinds of data. The keyboard 35 and the mouse 36 are examples of input apparatuses and are used to perform various kinds of input. The monitor 37 is, for example, a liquid crystal display, and displays a user interface. The monitor 37 may also employ a touch panel and also function as an input unit. The communication interface 38 is an interface for communication with other devices, and employs standards such as Ethernet (registered trademark), FDDI, or Wi-Fi (registered trademark).

Next, the functional configuration of the control apparatus 20 will be described.

FIG. 1 shows an example of the functional configurations of the control apparatus 20. As shown in FIG. 1, the control apparatus 20 includes, as functional configurations, a work instruction input unit 21, an operation mode switching unit 22, a lock control unit 25, an operation control unit 26, and a sensor information obtaining unit 27. The operation mode switching unit 22 includes a lock state switching unit 23 and a control policy switching unit 24. Each functional configuration is realized by the CPU 31 reading out a learning program stored in the ROM 32 or the storage 34, and loading to and executing the program in the RAM 33. Note that at least one or all of the functions may be realized by a dedicated hardware apparatus.

The work instruction input unit 21 obtains a work instruction indicating work to be performed by the robot 10 from an external apparatus or a user. The abstraction degree and the granularity of the work instruction may be defined as necessary. Taking fitting work for fitting a peg as an example, the work instructions are, for example, "grip object using gripper 12", "move the gripper 12 close to hole", "find the hole and bring peg into contact with hole", "make peg parallel to hole", "insert peg into hole", and "fix peg at designated position". The work instruction may be defined with a lower or higher abstraction degree.

The operation mode switching unit 22 switches control for locking and unlocking the flexible portion 13 and the control policies used to control operation of the robot 10. In this embodiment, the operation mode switching unit 22 performs these two controls in response to a work instruction received from the work instruction input unit 21. Thus, a setting table 40 (see FIG. 4) in which work instructions and types of control policies used in the locking and unlocking of the flexible portion 13 are associated with each other is stored in advance in the operation mode switching unit 22, and the operation mode switching unit 22 determines the type of control policy to be used in locking and unlocking of the flexible portion 13 based on the input work instruction and the setting table 40.

Figure 4:
FIG. 4 is a diagram illustrating an example of a table showing a correspondence relation between work instructions, and a lock state of a flexible portion and a control policy.

FIG. 4 is a diagram showing an example of the setting table 40 stored in the operation mode switching unit 22. In this example, it is defined that a control policy that is based on a state space model be used for a work instruction for moving the gripper (Move) and a work instruction for fixing the gripper or a peg (Fix), and a machine learning-based control policy be used for a work instruction for finding a hole (Explore), a work instruction for making the peg parallel to the hole (Align), and a work instruction for inserting the peg into the hole (Insert). In the setting table 40, it is also possible to define a work policy that is to be used instead of defining which type of work policy is to be used. For example, for the Explore work, use of a machine learnt control policy for Explore work may be defined. Similar applies to the other types of work.

The lock state switching unit 23 determines whether the flexible portion 13 is to be locked or unlocked based on the work instruction received from the work instruction input unit 21 and the setting table 40, and outputs the determination result to the lock control unit 25. The control policy switching unit 24 determines the type of control policy or the control policy to be used by the operation control unit 26, based on the work instruction received from the work instruction input unit 21 and the setting table 40, and outputs the determination result to the operation control unit 26.

In response to input received from the lock state switching unit 23, the lock control unit 25 outputs an instruction for locking or unlocking the flexible portion 13 to the robot 10.

The operation control portion 26 generates an operation instruction designating an operation to the robot 10, and outputs the operation instruction to the robot 10. The operation control unit 26 uses the sensor information of the robot 10 obtained from the sensor information obtaining unit 27 (state measurement data; state variables) and the control policy designated by the control policy switching unit 24 to generate an operation instruction.

Note that the operation control unit 26 does not need to generate an operation instruction using all sensor information obtained from the sensor information obtaining unit 27, and may determine which piece of sensor information to use depending on the control policy to be used. For example, it is conceivable that, if a machine learning-based control policy is to be used, sensor information indicating the state of the flexible portion 13 be used, and if a control policy that is based on a state space model is to be used, sensor information indicating the state of the flexible portion 13 not be used.

The sensor information obtaining unit 27 obtains sensor information indicating the state of the robot 10 from the robot 10. Examples of sensor information indicating the state of the robot 10 are pieces of information obtained by an encoder provided in each joint, a visual sensor (camera), a force related sensor (inner force sensor, torque sensor, tactile sensor), and a displacement sensor.

(Processing)

Figure 5:
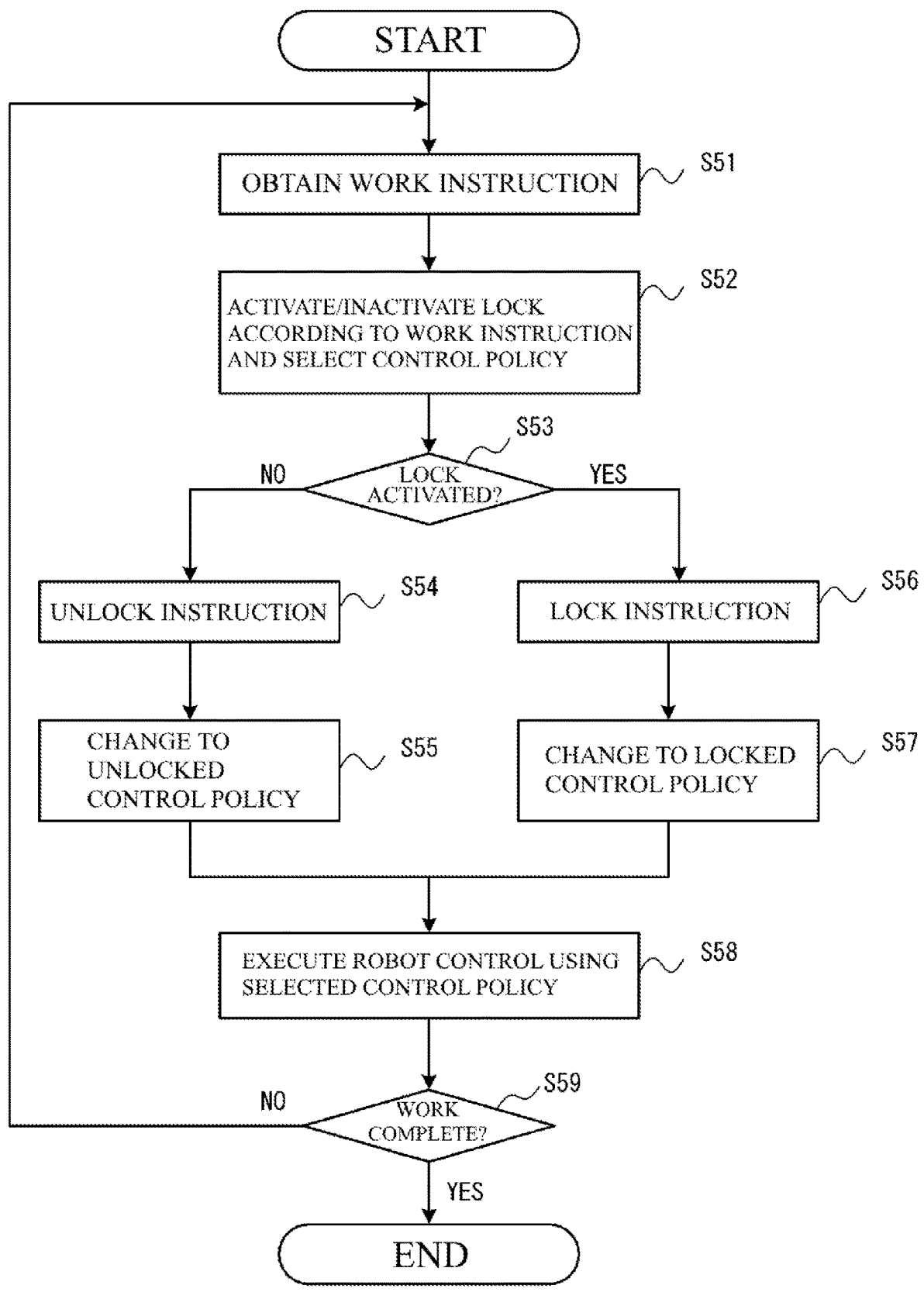
FIG. 5 is a diagram showing a control flow of the control apparatus.

FIG. 5 is a flow chart showing the flow of processing performed in a method for controlling the robot 10 that is performed by the control apparatus 20 of the present embodiment.

In step S51, the work instruction input unit 21 obtains a work instruction indicating the work that the robot 10 is to perform from an external apparatus or a user. In step S52, the operation mode switching unit 22 selects "active" or "inactive" for the locking of the flexible portion and the control policy to be used based on the work instruction and the setting table 40.

In step S53, a determination is made as to whether or not "locking active" was selected in step S52. If "locking active" was selected, the process proceeds to step S54, but if "locking inactive" was selected, the process proceeds to step S56. In step S54, the lock control unit 25 outputs an instruction to inactivate locking (unlock) of the flexible portion 13 to the robot 10, and in step S55, the operation control unit 26 reads the control policy for the unlocked state, that is the machine learning-based control policy. In step S56, the lock control unit 25 outputs an instruction to activate locking (lock) the flexible portion to the robot 10, and in step S57, the operation control unit 26 reads the control policy for the locked state, that is a control policy of classical control or control based on a state space model.

In step S57, the operation control unit 26 generates an operation instruction based on the control policy selected in step S54 or S56 and sensor information obtained from the sensor information obtaining unit 27, and executes control of the robot 10 by transmitting the operation instruction to the robot 10.

In step S58, whether or not the work is complete is determined, and if the work is not complete, the processing returns to step S51, otherwise the processing is terminated.

Advantageous Effects of Present Embodiment

There are cases where, depending on the work performed by the robot, it is favorable that the robot is imparted with flexibility and there are cases where it is favorable that the robot is not imparted with flexibility. When the robot is to be imparted with flexibility, it is preferable to perform control using a machine learning-based control policy based on the uncertainty of a hand position, meanwhile, when the robot is not to be imparted with flexibility, it is preferable to use an analytical control policy based on the certainty of the hand position. With this embodiment, it is possible to lock and unlock the flexible portion of the robot depending on the work to be performed by the robot, and because the control policies used in operation control are switched, it is possible to effectively cause the robot to perform various kinds of work. Also, locking and unlocking of the flexible portion and the control policy to be used are determined depending on the work instruction, and thus a control program of the robot can be created even if a user does not clearly designate the locking state of the flexible portion or the control policy to be used.

<Variations>

The aforementioned embodiments are nothing more than embodiments for providing an exemplary description of configuration examples of the present invention. The present invention is not to be limited to the above-described specific aspects, and various variations can be made within the technical scope of the present invention.

In the above embodiment, locking and unlocking of the flexible portion 13 and the control policy to be used are switched depending on the work instruction, but they may be controlled in any specific manner provided that different types of control policies are used depending on whether the flexible portion 13 is locked or unlocked.

For example, control of the locking state of the flexible portion 13 and the control policy to be used may be switched depending on the distance between the gripper 12 of the robot 10 and an object. More specifically, the control apparatus 20 unlocks the flexible portion 13 if the distance between the gripper 12 and the object is smaller than a threshold, and switches the control policy to be used by the operation control unit 26 to a machine learning-based control policy. On the other hand, if the distance between the gripper 12 and object is greater than a threshold, the control apparatus 20 locks the flexible portion 13 and switches the control policy to be used by the operation control unit 26 to a control policy of classical control or control based on a state space model.

In another example, control of the locking state of the flexible portion 13 and the control policy to be used may be switched depending on whether or not the gripper 12 of the robot 10 is in contact with an object. More specifically, if the gripper 12 is in contact with an object, the control apparatus 20 unlocks the flexible portion 13 and switches the control policy to be used by the operation control unit 26 to a machine learning-based control policy. On the other hand, if the gripper 12 is not in contact with the object, the control apparatus 20 locks the flexible portion 13, and switches the control policy to be used by the operation control unit 26 to a control policy of classical control or control based on a state space model.

Detection of the distance between the gripper 12 and an object or contact between the gripper 12 and the object may be determined based on sensor information obtained from a sensor provided in the robot 10 or a sensor that observes the robot 10.

Also, the control apparatus 20 may determine sensor information used by the operation control unit 26 to generate an operation instruction, depending on the control policy to be used. For example, the sensor information obtaining unit 27 may change the type of sensor information obtained from the robot 10, or the sensor information obtaining unit 27 may not change the sensor information obtained from the robot 10 but the sensor information obtaining unit 27 may change the sensor information supplied to the operation control unit 26 and change the sensor information to be used by the operation control unit 26. For example, it is conceivable that, when the flexible portion 13 is unlocked, that is when a machine learning-based control policy is used, sensor information indicating a relative positional relationship between the arm 11 and the gripper 12 of the robot 10 or inner force sensor information on the gripper 12 is used to generate an operation instruction, and when the flexible portion 13 is locked, these pieces of sensor information are not used.

APPENDIX

1. A control apparatus (20) of a robot that includes a flexible portion (13) and a locking mechanism for fixing the flexible portion, the control apparatus (20) including:
   a lock control unit (25) configured to control locking and unlocking of the flexible portion (13); and
   an operation control unit (26) configured to control operation of the robot using different types of control policies depending on whether the flexible portion (13) is locked or unlocked.
2. A control method of controlling a robot (10) that includes a flexible portion (13) and a locking mechanism for fixing the flexible portion and is to be performed by a control apparatus (20), the control method including:
   a lock controlling step of controlling locking and unlocking of the flexible portion (S54, S56);
   a policy selecting step of selecting a control policy to be used for control of operation of the robot depending on whether the flexible portion is locked or unlocked (S55, S57); and

an operation controlling step of controlling operation of the robot using the selected policy.

INDEX TO THE REFERENCE NUMERALS

1 Robot system
10 Robot
11 Arm
12 Gripper
13 Flexible portion
20 Control apparatus
The invention claimed is:
1. A robot system comprising:
a robot including an arm, a gripper configured to grip an object, and a flexible portion configured to allow the robot to perform a flexible behavior when the flexible portion is unlocked and to allow the robot to perform a rigid behavior when the flexible portion is locked;
a sensor configured to detect a distance or contact between the robot and the object; and
a control apparatus configured to control operation of the robot based on sensor information obtained from the sensor,
wherein the control apparatus comprises:
a lock control unit configured to switch the flexible portion to be locked to allow the robot to perform the rigid behavior in a case where the distance between the robot and the object is greater than a threshold, or the robot and the object are not in contact, and configured to switch the flexible portion to be unlocked to allow the robot to perform the flexible behavior in a case where the distance between the robot and the object is smaller than the threshold, or the robot and the object are in contact; and
an operation control unit configured to control operation of the robot based on the sensor information obtained from the sensor using a control policy of classical control or a control policy based on a state space model in a case where the flexible portion is locked and configured to control operation of the robot based on the sensor information obtained from the sensor using a machine learning-based control policy in a case where the flexible portion is unlocked, and
wherein the sensor information to be obtained includes sensor information indicating a state of the flexible portion,
and, in a case where the flexible portion is unlocked, the operation control unit determines that the sensor information indicating the state of the flexible portion is to be used in control of operation of the robot.
2. A robot system comprising:
a robot including an arm, a gripper configured to grip an object, and a flexible portion configured to allow the robot to perform a flexible behavior when the flexible portion is unlocked and to allow the robot to perform a rigid behavior when the flexible portion is locked;
a sensor configured to detect a distance or contact between the robot and the object; and
a control apparatus configured to control operation of the robot based on sensor information obtained from the sensor,
wherein the control apparatus comprises:
a lock control unit configured to switch the flexible portion to be locked to allow the robot to perform the rigid behavior in a case where the distance between the robot and the object is greater than a threshold, or the robot and the object are not in contact, and configured to switch the flexible portion to be unlocked to allow the robot to perform the flexible behavior in a case where the distance between the robot and the object is smaller than the threshold, or the robot and the object are in contact; and an operation control unit configured to control operation of the robot based on the sensor information obtained from the sensor using a control policy of classical control or a control policy based on a state space model in a case where the flexible portion is locked and configured to control operation of the robot based on the sensor information obtained from the sensor using a machine learning-based control policy in a case where the flexible portion is unlocked, and wherein the control apparatus determines the sensor information to be obtained from the sensor depending on the control policy to be used by the operation control unit.

3. The robot system according to claim 1, wherein the flexible portion is provided at at least one of an intermediate position of the gripper, a position between the gripper and the arm, and an intermediate position of the arm.

4. A control method for a robot system comprising (i) a robot including an arm, a gripper configured to grip an object, and a flexible portion configured to allow the robot to perform a flexible behavior when unlocked and to allow the robot to perform a rigid behavior when locked and (ii) a sensor configured to detect a distance or contact between the robot and the object, the control method comprising:

obtaining sensor information from the sensor;

determining whether the distance between the robot and the object is greater than a threshold or not, or whether the robot and the object are in contact or not in contact, based on the sensor information obtained from the sensor;

switching the flexible portion to be locked to allow the robot to perform the rigid behavior in a case where the distance between the robot and the object is greater than the threshold, or the robot and the object are not in contact, and switching the flexible portion to be unlocked to allow the robot to perform the flexible behavior in a case where the distance between the robot and the object is smaller than the threshold, or the robot and the object are in contact; and controlling operation of the robot based on the sensor information obtained from the sensor using a control policy of classical control or a control policy based on a state space model in a case where the flexible portion is locked, and controlling operation of the robot based on the sensor information obtained from the sensor using a machine learning-based control policy in a case where the flexible portion is unlocked, wherein the sensor information to be obtained includes sensor information indicating a state of the flexible portion, and, in a case where the flexible portion is unlocked, the sensor information indicating the state of the flexible portion is determined to be used in control of operation of the robot.

5. A non-transitory computer readable medium storing a program for causing a computer to execute each step of the method according to claim 4.

6. A control method for a robot system comprising (i) a robot including an arm, a gripper configured to grip an object, and a flexible portion configured to allow the robot to perform a flexible behavior when unlocked and to allow the robot to perform a rigid behavior when locked and (ii) a sensor configured to detect a distance or contact between the robot and the object, the control method comprising:

obtaining sensor information from the sensor;

determining whether the distance between the robot and the object is greater than a threshold or not, or whether the robot and the object are in contact or not in contact, based on the sensor information obtained from the sensor;

switching the flexible portion to be locked to allow the robot to perform the rigid behavior in a case where the distance between the robot and the object is greater than the threshold, or the robot and the object are not in contact, and switching the flexible portion to be unlocked to allow the robot to perform the flexible behavior in a case where the distance between the robot and the object is smaller than the threshold, or the robot and the object are in contact; and controlling operation of the robot based on the sensor information obtained from the sensor using a control policy of classical control or a control policy based on a state space model in a case where the flexible portion is locked, and controlling operation of the robot based on the sensor information obtained from the sensor using a machine learning-based control policy in a case where the flexible portion is unlocked, wherein the sensor information to be obtained from the sensor is determined depending on the control policy to be used in the operation of the robot.

7. A non-transitory computer readable medium storing a program for causing a computer to execute each step of the method according to claim 6.

* * * * *